United States Patent [19]

Sakakibara et al.

[11] Patent Number: 5,080,639
[45] Date of Patent: Jan. 14, 1992

[54] VARIABLE TRANSMISSION

[75] Inventors: Shiro Sakakibara, Toyokawa; Masahiro Hasebe, Anjo; Masashi Hattori, Anjo; Shigekazu Ohara, Anjo, all of Japan

[73] Assignee: Aisin AW Co., Ltd., Japan

[21] Appl. No.: 569,364

[22] Filed: Aug. 14, 1990

Related U.S. Application Data

[63] Continuation of Ser. No. 237,596, Aug. 26, 1988, abandoned.

[30] Foreign Application Priority Data

Aug. 28, 1987 [JP] Japan .................. 62-214378
Dec. 26, 1987 [JP] Japan .................. 62-330481

[51] Int. Cl.[5] .............................................. F16H 9/26
[52] U.S. Cl. ............................................... 475/211
[58] Field of Search ............... 79/640; 475/24, 210; 192/1.37, 1.39; 474/8, 11, 17, 18, 28, 69, 70

[56] References Cited

U.S. PATENT DOCUMENTS

| 583,402 | 5/1897 | Reeves | 474/8 X |
|---|---|---|---|
| 1,873,404 | 8/1932 | Hild | 474/70 X |
| 1,972,377 | 9/1934 | Laderriere | 474/17 X |
| 2,130,433 | 9/1938 | Webb | 474/17 X |
| 2,401,256 | 5/1946 | Lear | 192/1.37 X |
| 2,480,212 | 8/1949 | Baines | 192/1.39 |
| 2,695,086 | 11/1954 | Parker | 192/1.39 X |
| 2,746,583 | 5/1956 | Blevins | 192/1.39 |
| 2,905,289 | 9/1959 | Lee et al. | 192/1.39 |
| 3,034,368 | 5/1962 | Wingbermühle et al. | 474/18 |
| 3,269,207 | 8/1966 | Borsattino | 474/18 X |
| 3,735,167 | 5/1973 | Wickersheimer | 474/11 X |
| 3,934,492 | 1/1976 | Timbs | 74/689 X |
| 4,504,247 | 3/1985 | Chana et al. | 474/17 |
| 4,722,719 | 2/1988 | Klopfenstein | 474/18 X |
| 4,735,598 | 4/1988 | Moroto et al. | 474/29 |
| 4,770,065 | 9/1988 | Wayton | 474/18 X |

FOREIGN PATENT DOCUMENTS

| 503730 | 12/1954 | Italy | 474/17 |
|---|---|---|---|
| 534195 | 10/1955 | Italy | 474/18 |
| 52-8259 | 1/1977 | Japan | 474/8 |
| 57-37023 | 3/1982 | Japan | 474/18 |
| 62-13853 | 1/1987 | Japan | 474/11 |
| 62-13854 | 1/1987 | Japan | 474/11 |
| 62-13855 | 1/1987 | Japan | 474/11 |
| 62-13856 | 1/1987 | Japan | 474/11 |
| 2177169 | 1/1987 | United Kingdom | 474/28 |

Primary Examiner—Dwight Diehl
Attorney, Agent, or Firm—Lorusso & Loud

[57] ABSTRACT

An output shaft of a motor is connected to an operating shaft through a reduction device made up by a spur gear or a helical gear, which is a reversible power transmission to drive actuator mechanisms on a primary pulley and secondary pulley at the same time. A holding device such as an electromagnetic brake, and so on, is installed to maintain the output shaft of the motor when the motor is under non-operation.

10 Claims, 4 Drawing Sheets

| POSITION | ELEMENS | C1 | C2 | CL | B1 | B2 | F |
|---|---|---|---|---|---|---|---|
| P | | | | | ○ | | |
| R | | | | | ○ | ○ | |
| N | | | | | ○ | | |
| D | L | ○ | | ○* | | | ○ |
| | H | ○ | ○ | ○* | | | |
| S | L | ○ | | ○* | ○ | | ○ |
| | H | ○ | ○ | ○* | | | |

PRIOR ART

VARIABLE TRANSMISSION

This application is a continuation of application Ser. No. 237,596, filed Aug. 26, 1988 now abandoned.

BACKGROUND OF THE INVENTION

The present invention relates to a continuously variable transmission, particularly to a continuously variable transmission preferable for an automatic stepless transmission mounted on an automobile, and detailedly to a shift driving by a motor.

DESCRIPTION OF THE PRIOR ART

A continuously variable transmission (CVT), in general, has a primary pulley and secondary pulley both of which have a movable sheave and a stationary sheave. A metal belt is lapped around the primary and secondary pulleys, and the movable sheaves are operated by hydraulic pistons to vary shifting ratio.

Because of hydraulic power, the continuously variable transmission requires an oil pump and hydraulic circuits, so that the transmission becomes complicated and large, and an extra belt holding force is required, consequently transmission efficiency and durability of the belt are not satisfactorily secured. Furthermore, if hydraulic pressure is lowered by some reasons, it causes a lack of belt holding force, which makes power transmission impossible.

Then the applicant of the present invention proposed a continuously variable transmission 30', as shown in FIG. 5 (refer to Japanese patent publication 62-13853) which has a primary pulley 31, a secondary pulley 32, and a belt 33 lapped around the primary and secondary pulleys 31, 32. Movable sheaves 31b and 32b of both pulleys 31, 32 are operated in axial direction by actuator mechanisms 35, 36 such as ball screw devices, and a torque/thrust converting mechanism 34 is provided on a stationary sheave 31a to provide axial force proportional to torque transmitted.

The continuously variable transmission 30' has one counter shaft 57 as a transmission operating device. The counter shaft 57 is connected to a primary side ball screw device 35 through a pair of circular gear 62, 26, and connected to a secondary side ball screw device 36 through a pair of non-circular gear 65, 47. A worm wheel 66 is connected to the shaft 57, and the worm wheel 66 meshes with a worm gear 67 on the motor side. By the worm wheel 66 and the worm gear 67, the mechanism and devices following the shaft 57 is retarded and held at required position.

Accordingly, the above continuously variable transmission 30' transmits the motor power by the worm wheel 66 and the worm gear 67, so the transmission 30' requires no additional brakes because reaction force from the counter shaft 57 is supported on the gear side. However transmission ratio of a worm mechanism is low, or about 40 percent, and inevitably motor capacity has to be set about 2.5 times as much as load. This requires a large-capacity motor, and an increase of electricity consumption.

SUMMARY OF THE INVENTION

The present invention is to provide a reduction device with high efficiency, and a small-sized and power saving motor.

Accordingly the present invention provides:

a continuously variable transmission (30), as shown in FIG. 1, includes a primary pulley (31) and a secondary pulley (32) made up by two sheaves (31a), (31b), (32a), (32b) to be supported on shafts (30b), (30a) respectively and movable in axial direction, and a belt a (33) lapped around the primary and secondary pulleys (31), (32). Furthermore, the transmission (30) includes a torque/thrust converting mechanism (34) mounted on at least one of the primary and secondary pulleys (31), (32) to provide axial force proportional to torque transmitted, actuator mechanism (35), (36) such as ball screw devices to move the movable sheaves of the both primary and secondary pulleys (31), (32), and a motor (109) to drive the actuator mechanism (35), (36) when shifting is required.

And a reduction device (107) made up by gear teeth capable of reversible power transmission is connected an output shaft (109a) of the motor (109) and an operating shaft (101) to drive the actuator mechanism (35), (36) on the primary and secondary pulleys (31), (32) at the same time.

Holding means (111) is maintain the operating shaft (101) restrained when the motor (109) is not operational.

In accordance with the above structure, when shifting is required, the motor (109) works so that the output power of the motor (109) retards at the reduction device (107) with high efficiency, and the retarded output is transferred to the operating shaft (101). Then, by the operating shaft (101), the actuator mechanism (35), (36) of the primary pulley (31) and the secondary pulley (32) work at the same time, so that the effective diameter of the belt (33) is varied to obtain a certain torque ratio. Further, by the holding means (111), the above torque ratio is maintained even if the motor (109) is stopped.

The numbers and marks shown in the parentheses are to refer the corresponding drawing(s), and there is no meaning to define structure of the present invention.

The above objects, features and advantages of the present invention will become apparent from the following description and appended claims, taken in conjunction with the accompanying drawings which show by way of example some illustrative embodiments of the invention.

BRIEF DESCRIPTION OF THE DRAWINGS

In the accompanying drawings:

FIGS. 6 and 7 are partial side views of the spur gear and helical gear, respectively, of a reduction device.

DETAILED DESCRIPTION OF THE PREFERRED EMBODIMENT

Figures 2, 3:
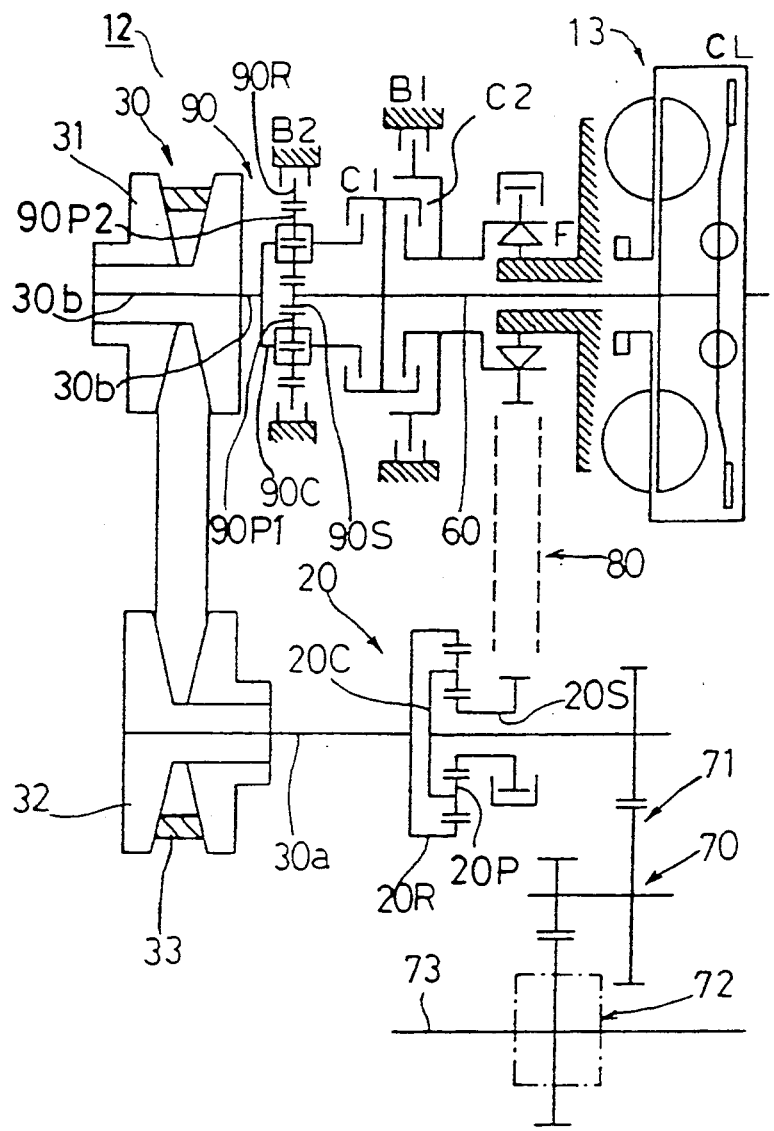
FIG. 2 is a skeleton drawing of the continuously variable automatic to which the present invention is applied.
FIG. 3 is a table of operation of the continuously variable automatic transmission.

A continuously variable automatic transmission to which the present invention is applied is explained as follows:

The continuously variable automatic transmission 12, as shown in FIG. 2, includes single planetary device 20, a continuously variable transmission 30, a transfer device 80, an input shaft 60, an output element 70 made up by a reduction gear device 71 and a differential 72, a fluid coupling 13 having a lock up clutch CL and a forward/reverse switching device 90 made up by a dual planetary gear. An element 20S (or 20R) which is a reaction supporting member when the single planetary device 20 is used as a reduction gear mechanism is connected to restraining means F, B1 through the transfer device 80, and is connected/disconnected to the input shaft 60 through hi-clutch C2.

More concretely, a ring gear 20R is connected to a secondary shaft 30a of the continuously variable transmission 30, and a carrier 20C is connected to the output member 70, and the sun gear 20S is connected to a low one way clutch F, a low coast and reverse brake B1 and the hi-clutch C2.

Concerning the forward/reverse switching device 90, a sun gear 90S is connected to the input shaft 60, a carrier 90C is connected to a primary shaft 30b of the continuously variable transmission 30, and connected to the input shaft 60 through a forward clutch C1, and a ring gear 90R is connected to a reverse brake B2.

In accordance with the above structure of the continuously variable automatic transmission 12, the clutches, the brakes and one way clutch operate at each position as shown in FIG. 3. In the table of operation * mark means that the lock up clutch operates at required moment.

The following is the description in detail, at low speed side L in D range; the forward clutch C1 operates, and the one way clutch F operates. Under this condition rotation of the engine crank shaft is transmitted to the input shaft 60 through the lock up clutch CL of the fluid coupling 13, directly transmitted to the sun gear 90S, and transmitted to the carrier 90C through the forward clutch C1. Accordingly the forward/reverse switching device 90 rotates together with the input shaft 60, this normal rotation is transmitted to the primary shaft 30b of the continuously variable transmission 30, and the rotation is shifted to required speed, the shifted rotation is transmitted from the secondary shaft 30a to the ring gear 20R of the single planetary gear device 20, while the sun gear 20S receiving the reaction force is restrained by the low one way clutch F through the transfer device 80, and then the rotation of the ring gear 20R is taken from the carrier 20C as retarded rotation. After that the retarded rotation is transmitted to the reduction gear device 71, the differential 72 and an axle 73.

At high speed side H in D range; in addition to the clutch C1, the hi-clutch C2 is engaged. Under this condition, as stated in the previous paragraph, normal rotation shifted to required speed at the continuously variable transmission 30 is taken from the secondary shaft 30a and transmitted to the ring gear 20R, while rotation of the input shaft 60 is transmitted to the sun gear 20S through the hi-clutch C2 and the transfer device 80. As a result the torque of the ring gear 20R and the sun gear 20S is combined, and taken from the carrier 20C. At this time rotation against the reaction force is transmitted to the sun gear 20S through the transfer device 80, so that a torque loop does not come about. Consequently certain positive torque is transmitted through the transfer device 80, and the combined torque from the carrier 20C is transmitted to the reduction gear device 71, the differential 72 and the axle 73.

With regard to the operation at D range, torque is not transmitted when reverse torque is applied (or engine brake is applied.) because of the one way clutch F, while at S range torque is transmitted when reverse torque is applied because of the operation of the low coast and reverse brake B1 in addition to the low one way clutch F.

At R range, the low coast and reverse brake B1 and the reverse brake B2 are applied. Under this condition, rotation of the input shaft 60 is transmitted from the carrier 90C to the continuously variable transmission 30 as a reverse rotation because the ring gear 90R is restrained. On the other hand, the sun gear 20S is restrained because of the low coast & reverse brake B1, and the reverse rotation from the continuously variable transmission 30 is retarded by the planetary gear device 20, and is taken from the output member 70.

At P and N range, the low coast and reverse brake B1 is applied.

Figure 1:
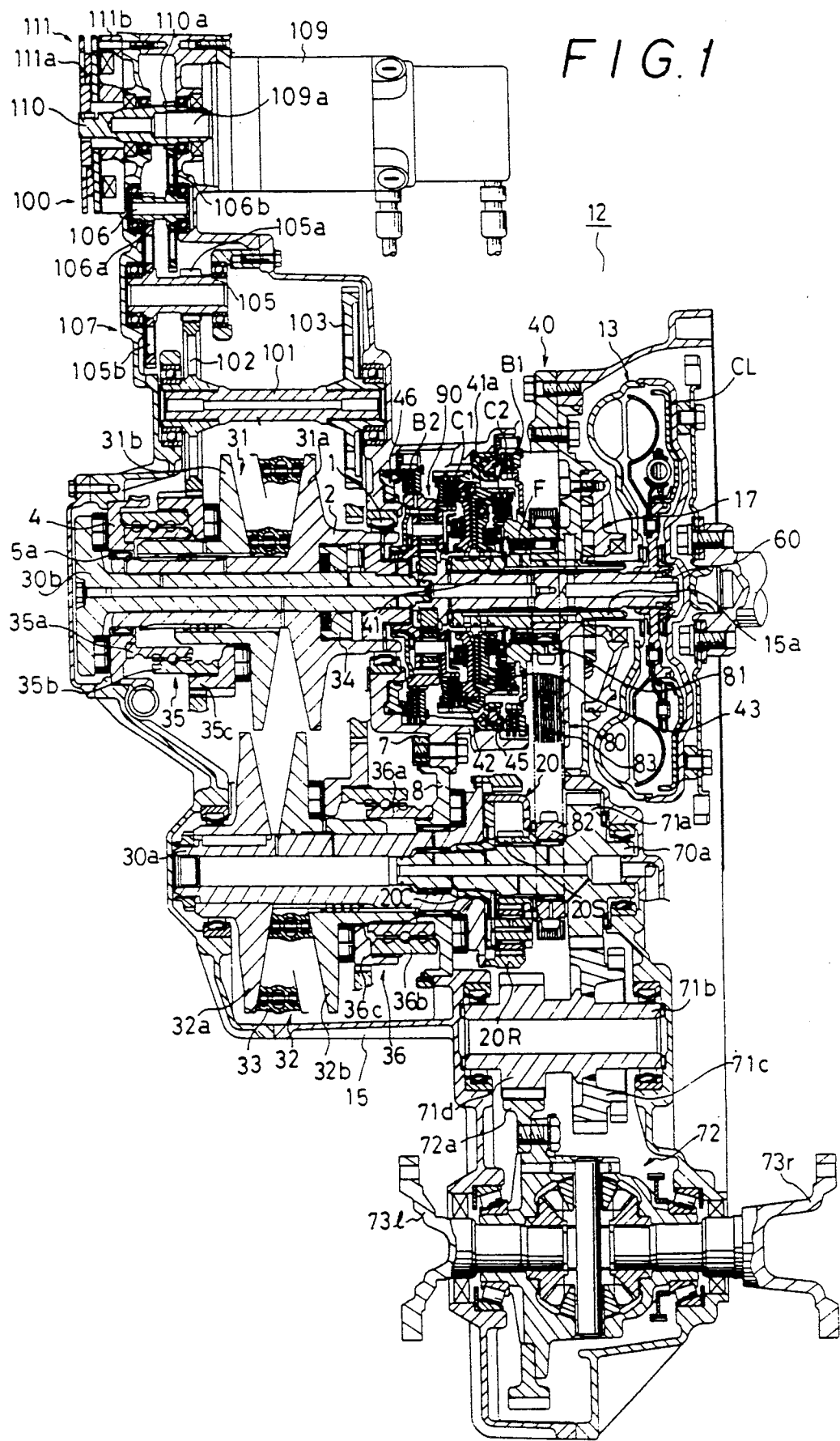
FIG. 1 is a cross sectional view of a continuously variable automatic transmission on the present invention.

More concrete explanation of the continuously variable automatic transmission along with FIG. 1 is provided as follows:

The continuously variable automatic transmission 12 has a transmission case 15 separable in three portions. In this case 15 the input shaft 60 and the primary shaft 30b are coaxial (side by side) to rotate freely, so that first axle is formed, and the secondary shaft 30a and a gear shaft 70a are coaxial (side by side) to rotate freely, so that the second shaft is formed. Furthermore on the first axle the fluid coupling 13 having the lock up clutch CL; the control division 40 having the forward clutch C1, the hi-clutch C2, the low coast and reverse brake B1, the reverse brake B2, the low one way clutch F; the dual planetary gear device 90 making up the forward/reverse switching device; and an oil pump 17 are provided. And on the second axle the single planetary gear device 20 is provided.

Explanation on the control division 40 and input sections of the transmission 12 is as follows:

The lock up clutch CL and the fluid coupling 13 are mounted coaxially on one end of the input shaft 60, the sun gear 90S of the dual planetary device 90 is mounted coaxially on another end of the input shaft 60, and a sleeve 15a fixed on the case 15 is set coaxially around the input shaft 60. On the sleeve 15a, a sprocket 81 encloses through the one way clutch F, and a sleeve shaft 41 connected to the input shaft 60 is supported rotatably. From the sleeve shaft 41 a flange 41a extends coaxially. On one side of the flange 41a, the forward clutch C1 and its hydraulic actuator 42 are installed, while on another side of the flange 41a, the hi-clutch C2 and its hydraulic actuator 43 are installed. A "power-transmitted-side" of the hi-clutch C2 is connected to a boss of the sprocket 81, and the boss is connected to the low coast and reverse brake B1 which is installed on the case 15 with its hydraulic actuator 45. On the other hand, a "power-transmitted-side" of the forward clutch C1 is connected to the carrier 90C, and the ring gear 90R is connected to the reverse brake B2 which is installed on the case 15 with its hydraulic actuator 46. (refer to FIG. 2) The carrier 90C supports a pinion 90P1 and a pinion 90P2 which mesh with each other, and the former(90P1) meshes with the sun gear 90S and the latter(90P2) meshes with the ring gear 90R. (refer to FIG. 2).

The single planetary gear device 20 is mounted coaxially on the gear shaft 70a which makes up the second shaft, and the ring gear 20R is connected to a flange q which is a part of the secondary shaft 30a. On the gear shaft 70a, a sprocket 82 and the sun gear 20S are mounted side by side and rotatably, and further the sprocket 82 and the sun gear 20S are made as one solid part. And the carrier 20C supporting the pinion 20P rotatably is splined on the gear shaft 70a.

Between the sprocket 81 and the sprocket 82 a silent chain 83 is lapped around. The sprockets 81, 82 and the chain 83 make up the transfer device 80.

The gear shaft 70a on which a gear 71a is made inseparably makes up the output member 70, and the gear 71a meshes with a gear 71c fixed on an intermediate shaft 71b. On the intermediate shaft 71b a small gear 71d is made, and the gear 71d meshes with a ring gear 72a fixed on the differential 72, so the reduction device 71 is made up. From the differential 72 a right front axle 73r and a left front axle 73l are extended.

Figure 4:
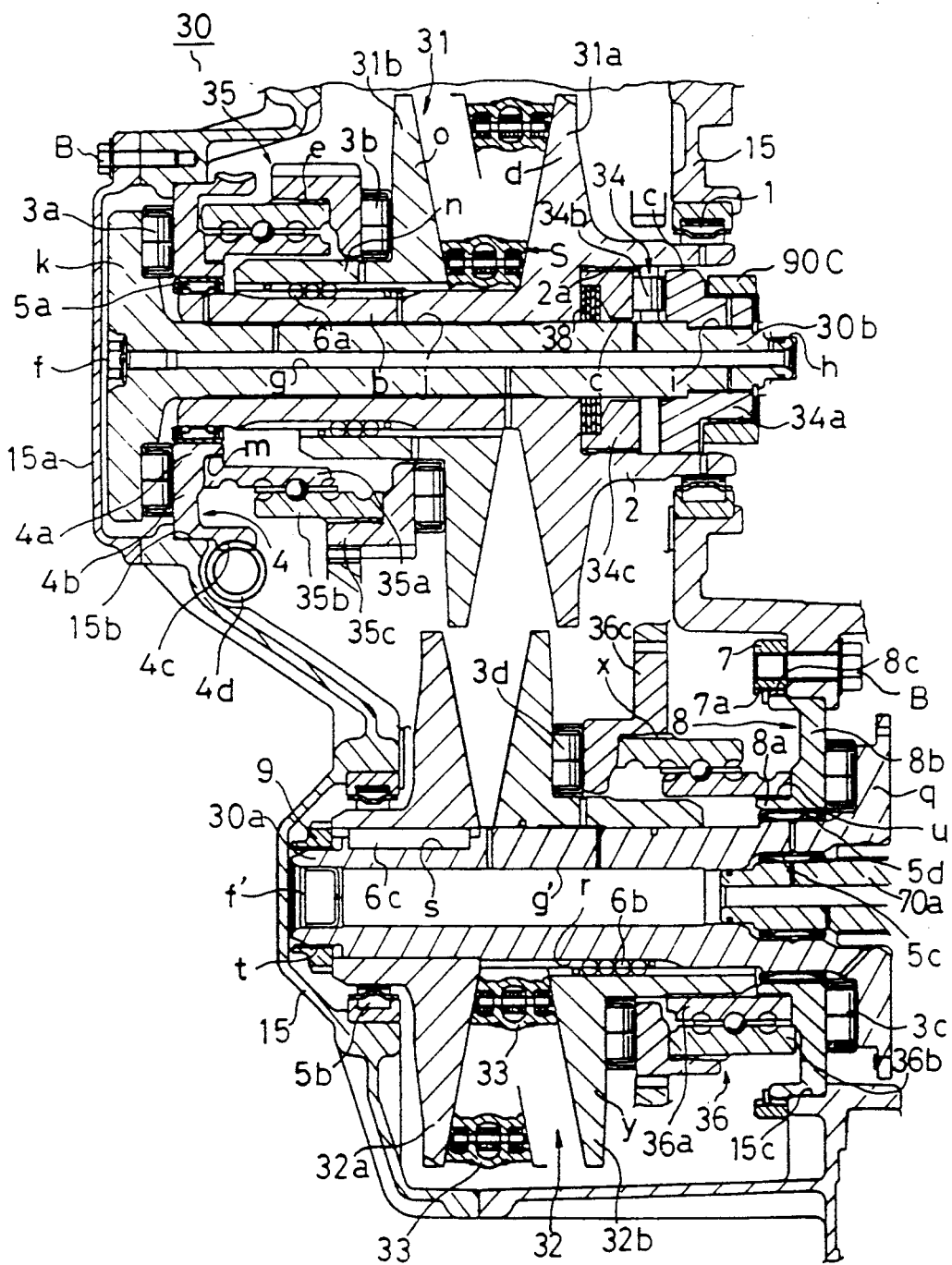
FIG. 4 is a cross sectional view of the continuously variable transmission.
Figure 5:
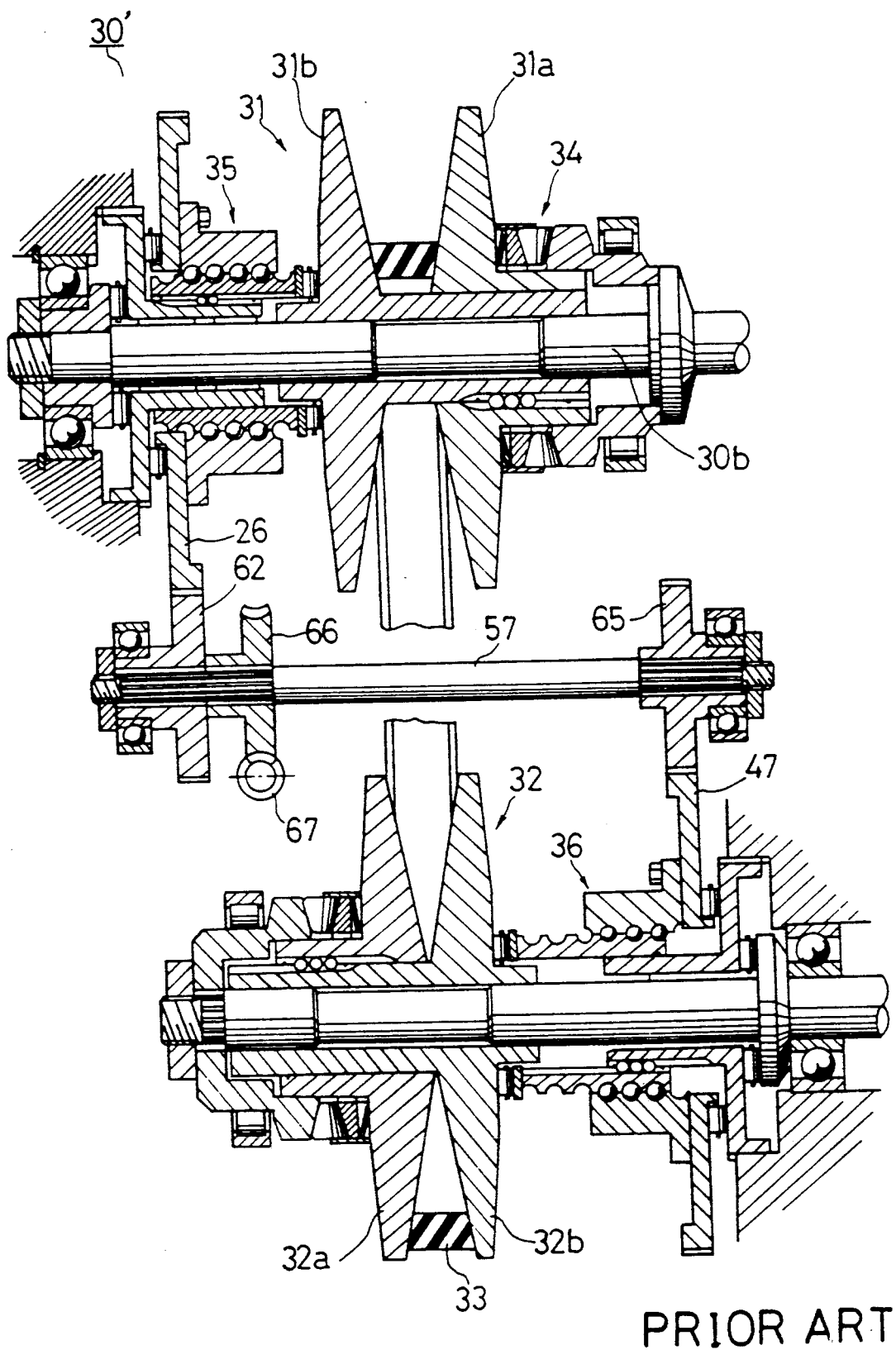
FIG. 5 is a cross sectional view of a prior art.

The continuously variable transmission 30 related to the present invention, as shown in FIG. 4, is made up by the primary pulley 31, the secondary pulley 32 and the belt 33 lapped around the pulley 31 and 32, wherein the primary and secondary pulleys have stationary sheaves 31a, 32a and movable sheaves 31b, 32b.

The stationary sheave 31a of the primary pulley 31 encloses the primary shaft 30b, has a boss b extending toward the movable sheave 31b, and has a hub 2 on the back side of a flange d. The outer surface of the hub 2 is supported by the case 15 through a roller bearing 1, while the torque/thrust converting mechanism 34 is set on the inner side of the hub 2. The torque/thrust converting mechanism 34 has a stationary race 34a having wavy end surface, a movable race 34c and a roller 34b held between the races 34a and 34c. The stationary race 34a is screwed and fixed by snap ring, etc. at the top edge of the primary shaft 30b, while the movable race 34c is guided by a spline 2a of the hub 2, so that the movable race 34c can move in axial direction only.

Slits care provided between the stationary race 34a and the inner surface of hub 2, and between the movable race 34c and the primary shaft 30b, so that between the sections mentioned above torque transmission by frictional contacts is not performed. The stationary race 34a and the carrier 90C are coupled by a spline made on the outer surface of the stationary race 34a, and the movable race 34c transmits torque to the stationary sheave 31a through the spline 2a and also transmits axial force S proportional to torque transmitted through dish spring 38 which is installed in the concave section of the hub 2. And the dish spring 38 provides pre-load.

The primary shaft 30b whose center has an oil path g and many side paths to distribute lubrication oil has a connecting end h to be enclosed by the input shaft 60, threads i to screw up the stationary race 34a, and oil groove j along a section where the boss b of the stationary sheave 31a encloses the shaft 30b. At the end of the primary shaft 30b or the opposite side of the device 90, the shaft 30b is diametrically enlarged and a flange k is formed. Furthermore, the brim of the flange k, opposite side of the case 15, a space is provided for receiving a thrust bearing 3a. A cap 15a, as covering the flange k, is fixed on the case 15 by a bolt B, while a retainer 4 is supported and set on a shoulder 15b of the case 15.

The adjustable retainer 4 is made up from a cylindrical member, its inner brim 4a supports the edge of the stationary sheave 31a through a radial roller bearing 5a, while a spline m is formed on the outside of the brim 4a, and its side wall 4b supports the thrust bearing 3a. The outer brim extrudes from the shoulder 15b, and a worm wheel 4c is formed on the outer brim. The worm wheel 4c meshes with a worm 4d, so that by turning the worm 4d, the retainer 4 contacting the bearing 3a rotates without being moved axially.

Concerning the movable sheave 31b, its boss n is free slidably supported by the boss b of the stationary sheave 31a through ball spline 6a, and on its flange o a ball screw device 35 is installed. The ball screw device 35 has a bolt section 35a and a nut section 35b, and an inside of the bolt section 35a is connected to the brim 4a of the adjustable retainer 4 by the spline m, while on the outer surface of the nut section 35b spline e is formed, and a circular gear section 35c whose outer surface has a spur gear is connected to the nut section 35b through the spline e. A thrust bearing 3b is placed between the gear section 35c and a flange "o" of the movable sheave 31b. Consequently the bolt section 35a is connected to the case 15 through the adjustable retainer 4 without rotation, and connected to the primary shaft 30b without moving axially, while the nut section 35b is connected to the movable sheave 31b through the thrust bearing 3b so that the nut section moves together with the movable sheave 31b in the axial direction.

The secondary pulley 32 has the stationary sheave 32a and the movable sheave 32b. The stationary sheave 32a is free rotationally supported in the case 15 through a roller bearing 5b, and is fixed to the secondary shaft 30a by a key 6c. The movable sheave 32b is free slidably supported on the secondary shaft 30a by ball spline 6b in the axial direction only.

The secondary shaft 30a has an oil path g' whose diameter is comparatively large, and a lot of side paths to distribute lubrication oil. The top end of the secondary shaft 30a is covered by a cap f'. At another end of the secondary shaft 30a or the side of the planetary gear device 20, the diameter of secondary shaft 30a is enlarged and formed a flange q. The oil path g' is also enlarged in accordance with the flange q, and an enlarged part of the oil path g' encloses the output shaft 70a through a needle bearing 5c. On the surface of the secondary shaft 30a, from the flange q, a ball groove r, a key groove s and a thread t are formed in this order. The movable sheave 32b is supported through the ball spline in the groove r, the stationary sheave 32a is fixed by the key set in the key groove s, and a nut member 9 is screwed on the thread t.

On a vertical plane where the needle bearing 5c is set, an adjusting ring 7 is fixed by a bolt B. The inside of the ring 7, a lot of gear teeth 7a are formed. On a shoulder of the case 15, an adjustable retainer 8 is supported and set. The retainer 8 has a cylindrical member whose inner brim 8a supports the secondary shaft 30a through a roller bearing 5d. On the outer side of the brim 8a a spline u is formed. And the thrust bearing 3c is held between a side wall 8b and the flange q. Furthermore, an outside brim extruding from the shoulder has a gear teeth 8c, and the gear teeth 8c selectively meshes with the thread 7a of the ring 7.

A ball screw device 36 is installed on a flange y of the movable sheave 32b. The ball screw device 36 has a bolt section 36a and a nut section 36b. The bolt section 36a has a groove on its inner side to couple the spline u of the retainer 8. The nut section 36b has a spline x on its outer side, and is connected to a non-circular gear section 36c whose outer surface has a spiral gear. A thrust bearing 3d is placed between the non-circular gear section 36c and a flange y. Consequently, the bolt section 36a is connected to the case 15 without rotation through the ring 7 to hold and the adjusting retainer 8, and is also connected to the case 15 without slide in the axial direction through the thrust bearing 3c placed on the flange q. The nut section 36b is connected to the movable sheave 32b through the thrust bearing 3d so that the nut section 36b moves together with the movable sheave 32b.

A shift driving device 100, as shown in FIG. 1, to vary a distance of the sheaves of the primary and secondary pulleys 31, 32 is laid between the primary and secondary pulleys as forming a triangle shape. The shift driving device 100 has an operating shaft 101 supported rotatably in the case 15. For reference purpose, FIG. 1 is a development drawing, so the operating shaft 101 is depicted in upper side. However, an actual arrangement is that the operating shaft 101 is located intermediately between the primary shaft 30b and the secondary shaft 30a. The operating shaft 101 has a circular gear 102 and non-circular gear 103. The circular gear 102 meshes with the circular gear 35c fixed on the nut section 35b on the primary pulley 31, while the non-circular gear 103 meshes with the non-circular gear 36c fixed on the nut section 36b on the secondary pulley 32.

The circular gear 102 also meshes with a small gear 105a having a spur gear (refer to FIG. 6) or a helical gear (refer to FIG. 7). The gear 105a is made on an intermediate shaft 105. The intermediate shaft 105 has a large gear 105b meshing with a small gear 106a made on an intermediate shaft 106. A reduction device 107 having three stage gear rows of high transmission efficiency is made up by these gears mentioned above which are capable of reversible power transmission.

A comparatively small electrical (or ultrasonic) motor 109 is mounted outside of the case 15. An output shaft 109a of the motor 109 is enclosed by a shaft 110 having a small gear 110a meshing with the above mentioned large gear 106b. A brake disc 111a is fixed on the shaft 110. An electromagnetic coil 111b is fixed on the case 15, the electromagnetic coil 111b and the brake disc 111a make up an electromagnetic brake 111 to stop the motion of the operating shaft 101. On the other hand, on the condition that an ultrasonic motor is introduced, a holding mechanism such as the electromagnetic brake, and so on, is not required because the ultrasonic motor contains holding means.

For gear rows of the reduction device 107, except for worm gear, helical gear as well as spur gear, bevel gear or planetary gear are possible to be used. The brake 111, as shown in this embodiment, is fixed on the shaft 110 which encloses the motor output shaft 109a as one body, so that holding power is possible to be minimized due to the gear ratio of the reduction device 107. Then, brake device itself is possible to be minimized, while the brake 111 can be installed in any place between the motor output shaft 109a and the operating shaft 101, and hydraulic brake, and so on is possible.

Operation of the electromagnetic brake 111 is controlled to link with the motor 109. When the motor 109 is driven, the brake is released by electrical power being supplied, while when the motor 109 is restrained, the brake works by electrical power being cut.

The motor 109 is possible to be a step motor such as a rotatory magnetic field type motor, an ultrasonic motor, and a servo motor as well as commutator type motor.

An explanation of assembly of the continuously variable transmission 30 is as follows:

On the primary (shaft/pulley) side, the thrust bearing 3a is set on the flange k from the thread i side; an assembly having the stationary shave 31a, the movable sheave 31b, the thrust bearing 3a, the ball screw device 35 and the adjustable retainer 4 is inserted along the primary shaft 30b; the dish spring 38, the movable race 34c and the roller 34b are set in the hub 2; the stationary race 34a is fixed by the thread i, so that the assembly is completed. On the secondary (shaft/pulley) side, the thrust bearing 3c is set on the flange q from the thread t side; the adjustable retainer 8, the ball screw device 36, the movable sheave 32b and the stationary sheave 32a are set on the secondary shaft 30a in this order; the nut member 9 is fixed by the thread t, so that the assembly is completed.

The assembly of the primary side with the belt 33 between the sheaves 31a, 31b is installed in the case 15 by inserting the hub 2 into the roller bearing 1, and by inserting the adjustable retainer 4 into the shoulder 15b of the case 15 separable in two pieces. The assembly of the secondary side is installed in the case 15 by inserting the adjustable retainer 8 into the shoulder 15c, and by inserting the roller the boss of movable sheave 32b into the roller bearing 5b.

In this condition, because of dimensional errors of each element, initial tension of the belt 33 is not properly adjusted. Accordingly, a stroke in the torque/thrust converting mechanism 34 is large when transmitted torque is reversed, so, at the secondary side, the adjustable retainer 8 is turned to adjust a distance of the secondary pulley 32. This adjustment is performed by relative rotation between the bolt section 36a to which the retainer 8 is connected and the nut section 36b. Then the gear teeth 7a of the ring 7 to hold mesh with the gear teeth 8c of the retainer 8, and the ring 7 is fixed by the bolt B, while at the primary side, the retainer 4 is turned by the worm 4d. Then the bolt section 35a to which the retainer 4 is connected rotates, and the nut section 35b is moved in axial direction, so that the distance of the primary pulley is properly adjusted. Due to the above, the initial tension of the belt is set, and the axial position of the primary and secondary pulleys to provide proper running line of the belt 33 is determined so that the stroke of the torque/thrust adjusting mechanism 34 is properly set.

The worm 4d is arranged to be operated from the outside of the case 15, so that it is possible to do the above adjustment after the case 15 is assembled. And the worm 4d is installed on either the secondary side or the primary side, or the both. Furthermore, the adjustable retainer is set on either the primary side or the secondary side.

Operation on the present invention is as follows:

Rotation of the engine crank shaft is transmitted to the input shaft 60 through the lock up clutch CL or the fluid coupling 13. The rotation is further transmitted to the sun gear 90S of the dual planetary gear device 90, and the sleeve shaft 41. In D range and S range, as the forward clutch C1 is engaged and the reverse brake B2 is released, the sun gear 90S and the carrier 90C rotate together, and this normal rotation is transmitted to the stationary race 34a of the torque/thrust converting mechanism 34.

The rotation of the stationary race 34a makes the primary shaft 30b and the stationary sheave 31a rotate through the roller having wavy end and through the spline 2a, and the movable sheave 31b rotates through the ball spline 6a. And, the stationary sheave 31a is supported through the bearings 1 and 5a. The slits c lie between the stationary race 34a and the hub 2, and the movable race 34c and between the primary shaft 30b. Because of the above, power transmission by frictional contact is not performed from the stationary race 34a and primary shaft 30b to the stationary sheave 31a, accordingly all the torque transmitted from the carrier 90C is conveyed to the stationary sheave 31a through the torque/thrust converting mechanism 34. The torque/thrust converting mechanism 34 transmits axial force to the back of the stationary sheave 31a, wherein the axial force is propor tional to the torque transmitted to the stationary race 34a. Further, the ball screw device 35 is fixed according to certain speed ratio, so reaction force equal to the axial force is transmitted to the back of the movable sheave 31b. Then, the primary pulley 31 holds the belt 33 by the force proportional to the input torque. The axial force transmitted to the movable sheave 31b is conveyed to the flange k of the primary shaft 30b through the thrust bearing 3b, the ball screw device 35, the adjustable retainer 4 and through the thrust bearing 3a, while the axial force transmitted to the stationary sheave 31a is conveyed to the primary shaft 30b from the stationary race 34a through the threads i. Consequently, the axial force is held in the shaft 30b as tension. Rotation of the belt 33 is transmitted to the secondary pulley 32, and transmitted to the secondary shaft 30a through the key 6c and the ball spline 6b.

When the continuously variable transmission is driven, the operating shaft 101 rotates by the control of the motor 109 through the reduction device 107. The motor 109 receives signals from throttle opening ratio and sensors detecting car speed, and so on.

Then, the nut section 35b of the ball screw device 35 through the circular gears 102 and 35c, while the nut section 36b of the ball screw device 36 rotates through the non circular gears 103, 36c. Due to the above motion, the bolt sections and nut sections 35a-35b, 36a-36b rotate relatively, so that the ball screw devices 35, 36 move the movable sheaves 31b, 32b through the thrust bearings 3b, 3d to vary and set certain effective diameter and certain torque ratio.

Under the condition of torque ratio being set, power to the motor 109 is cut, and the electromagnetic brake 111 works to hold both primary and secondary pulleys. At this time, as the both ball screw devices move linearly, traveling distance of the ball screw device and that of the movable sheave set by the belt 33 have difference.

However the secondary pulley 32 rotates through the non-circular gear 103, 36c, the movable sheave is moved by compensated traveling distance corresponding to the actual distance of the movable sheave. Concerning belt holding force by the sheaves 31a-31b, and 31a-32b, on the primary pulley 31 side, the force so works that it gives tension to the primary shaft 30b through the thrust bearing, while on the secondary pulley 32 side, the belt holding force so works as it gives tension to the secondary shaft 30a. Accordingly no force works to the case.

Rotation of the secondary shaft 30a is transmitted to the ring gear 20R, and to the gear shaft 70a through the carrier 20C.

At low speed side L of D range, as shown in FIG. 3, the low one way clutch F works, so when torque is transmitted from the ring gear 20R to the carrier 20C, the sun gear 20S receives reaction force. However, the sun gear 20S is restrained by the low one way clutch F through the transfer device 80, so the single planetary gear device 20 constitutes reduction mechanism. The rotation of the secondary shaft 30a is simply retarded by the single planetary gear device 20, and is transmitted to the gears 71a, 71c, the intermediate shaft 71b, and to the reduction gear device 71. And the rotation is further retarded in the reduction gear device 71, and is transmitted to the right and left front axle shafts 73r, 73l, through the differential 72.

When throttle opening and car speed come to certain values, the hi-clutch C2 is switched to the high speed side by signal from control unit. Then the rotation of the input shaft 60 is transmitted to the continuously variable transmission 30, and is transmitted to the sprocket 81 through the sleeve shaft 41 and the hi-clutch C2. Further the rotation is transmitted from the sprocket 81 to the sun gear 20S through the silent chain 83 and the sprocket 82. At this time, the sprocket 81 at input side of the transfer device 80 receives reaction force from the sun gear 20S at the low one way clutch F. So, the sprocket 81 rotates smoothly when the hi-clutch C2 is connected with preventing shift shocks of gear changes, and the sprocket 81 transmits torque to the sun gear 20S. As a result, the torque steplessly varied by the continuously variable transmission 30 and torque of the transfer device 80 are combined, and the combined torque is transmitted from the carrier 20C to the gear shaft 70a. Furthermore, as in the low speed side, the torque is transmitted to the right and left front axles 73r, and 73l through the reduction gear device 71 and the differential 72.

At the low speed side L of S range, the sprocket 81 is stopped in normal and reverse rotations by the low coast and reverse brake B1 because negative torque due to engine brake, and so on, has to be received. And the high speed side H of S range is same as that of D range.

At R range, the forward clutch C1 is released and the reverse brake B2 is engaged. The rotation of the input shaft 60 transmitted to the ring gear 90S of the dual planetary gear device 90 is transmitted to the primary shaft 30b from the carrier 90C as a reverse rotation because the ring gear 90R is restrained. At the same time, the sprocket 81 is stopped by the low coast and reverse brake B1 because the reaction torque from the sun gear 20S through the transfer device 80 works to the sprocket 81 as reverse rotation.

Effects on the present invention are summarized as follows:

The reduction device 107 has gear rows of high transmission efficiency, so that the motor 109 is possible to be minimized. Consequently, power consumption on the motor 109 and load on battery side are lightened. The holding means 111 to maintain the operating shaft 101 restrained when the motor is under non-operation is introduced in addition to the reversible gears of high transmission efficiency included in the reduction device 107, so that such failures that pulleys 31, 32 are out of certain shifting ratio by force caused by the motion of the belt is surely prevented.

The holding means is a brake installed on the output side of the motor 109, and accordingly the capacity of the holding means is minimized, while the brake is the electromagnetic brake which works when electric power is not supplied to the motor 109, and accordingly power consumption is small, and operation is secured in case of failures on the control system.

The gear on the output side 105a of the reduction device 107 is to be an input gear on the operating shaft 101 concurrently, so that gear rows on this section becomes simple.

We claim:

1. A continuously variable transmission comprising:
   first and second shafts situated parallel to each other,
   a primary pulley situated on the first shaft and having a fixed sheave fixed on the first shaft and a movable sheave movable relative to the fixed sheave along the first shaft,
   a secondary pulley situated on the second shaft and having a fixed sheave fixed on the second shaft and a movable sheave movable relative to the fixed sheave along the second shaft,
   a torque/thrust converting mechanism attached to the fixed sheave of the primary pulley to provide axial force thereto corresponding to torque transferred from an engine,
   actuator mechanisms for moving the movable sheaves of the primary and secondary pulleys along the respective shafts to change distance between the movable sheave and the fixed sheave, respectively, each actuator mechanism having a bolt section and a nut section connected to the movable sheave,
   a belt situated between the primary and secondary pulleys,
   an adjustable retainer connected to the bolt section and having a worm wheel,
   a worm meshing with the worm wheel so that when the worm is rotated, the bolt section rotates to move the nut section to thereby adjust the position of the movable sheave,
   a reversible reduction device formed of a multiple stage gear, said reduction device being attached to the actuator mechanisms for simultaneously actuating the movable sheaves of the primary and secondary pulleys,
   a motor connected to the reduction device, said motor being operated at speed shifting operation and actuating the reduction device to simultaneously move the movable sheaves of the primary and secondary pulleys through the actuator mechanisms, and
   holding means attached to the reduction device, said holding means, when the motor does not operate, restricting movement of the reduction device so that locations of the movable sheaves do not accidentally change.

2. A continuously variable transmission of claim 1, wherein said holding means is a brake installed at said output shaft of the motor.

3. A continuously variable transmission of claim 2, wherein said brake is an electromagnetic brake which works to maintain said output shaft restrained when electric power to said motor is cut.

4. A continuously variable transmission of claim 1, wherein said motor is an ultrasonic motor.

5. A continuously variable transmission comprising:
   first and second shafts situated parallel to each other,
   a primary pulley situated on the first shaft and having a first stationary sheave and a first movable sheave axially movable along the first shaft and against said first stationary sheave,
   a secondary pulley situated on the second shaft and having a second stationary sheave and a second movable sheave axially movable along the second shaft and against said second stationary sheave,
   an actuator mechanism for axially moving at least one of the first and second movable sheaves to change distance between said one movable sheave and the stationary sheave coaxial with said one movable sheave, said actuator mechanism including a ball screw device, said ball screw device including a first circular gear, a nut section connected to said first circular gear, balls and a bolt section connected to the nut section through the balls,
   a belt situated between the primary and the secondary pulleys,
   speed reduction means, connected to the first circular gear, for receiving torque at a first rotational speed and for actuating at least one of the movable sheaves by transmitting torque to the ball screw device, at a second rotational speed which is less than said first rotational speed, said speed reduction means having a second circular gear to and connected to the first circular gear, and a third circular gear, coaxial with and larger than said second circular gear,
   a motor, for generating said torque at said first rotational speed, having an output shaft parallel to said first and second shafts and a fourth circular gear mounted on said output shaft and rotatably driven by said motor at said first rotational speed, said fourth circular gear being parallel and connected to said third circular gear for operating the actuating mechanism through the reduction device,
   a third shaft provided parallel to the first and second shafts,
   a fifth circular gear mounted on said third shaft and connected to the second circular gear and the first circular gear,
   a non-circular gear mounted on said third shaft coaxially with said fifth circular gear and connected to the actuator mechanism, and
   holding means connected to said third circular gear, said holding means locking said third circular gear when the motor is restrained, and releasing the said third circular gear when the motor is driven.

6. A continuously variable transmission according to claim 5, further comprising;
   a torque/thrust converting mechanism provided on at least one of the first and second shafts to provide axial force thereto corresponding to transferred torque from an engine.

7. A continuously variable transmission according to claim 5, further comprising:
   a sixth circular gear provided between said second and third circular gears and the output shaft of the motor, and
   a seventh circular gear provided coaxially with said sixth circular gear and connected to said third circular gear, said sixth circular gear being larger than said seventh circular gear.

8. A continuously variable transmission according to claim 5, wherein said holding means is a brake installed at said output shaft of the motor.

9. A continuously variable transmission according to claim 8, wherein said brake is an electromagnetic brake which works to prevent rotation of said output shaft when electric power to said motor is cut.

10. A continuously variable transmission according to claim 5, wherein said motor is an ultrasonic motor.

* * * * *

UNITED STATES PATENT AND TRADEMARK OFFICE
CERTIFICATE OF CORRECTION

PATENT NO. : 5,080,639
DATED : January 14, 1992
INVENTOR(S) : Sakakibara, et. al.

It is certified that error appears in the above-identified patent and that said Letters Patent is hereby corrected as shown below:

Column 2, line 22, after "is" insert --provided to--.
Column 4, line 26, after "that" insert --the--.
Column 12, line 20, after "gear" insert -- parallel--.

Signed and Sealed this

Fifteenth Day of June, 1993

Attest:

MICHAEL K. KIRK

Attesting Officer

Acting Commissioner of Patents and Trademarks